March 4, 1969  M. S. FRANT  3,431,182
FLUORIDE SENSITIVE ELECTRODE AND METHOD OF USING SAME
Filed Feb. 4, 1966
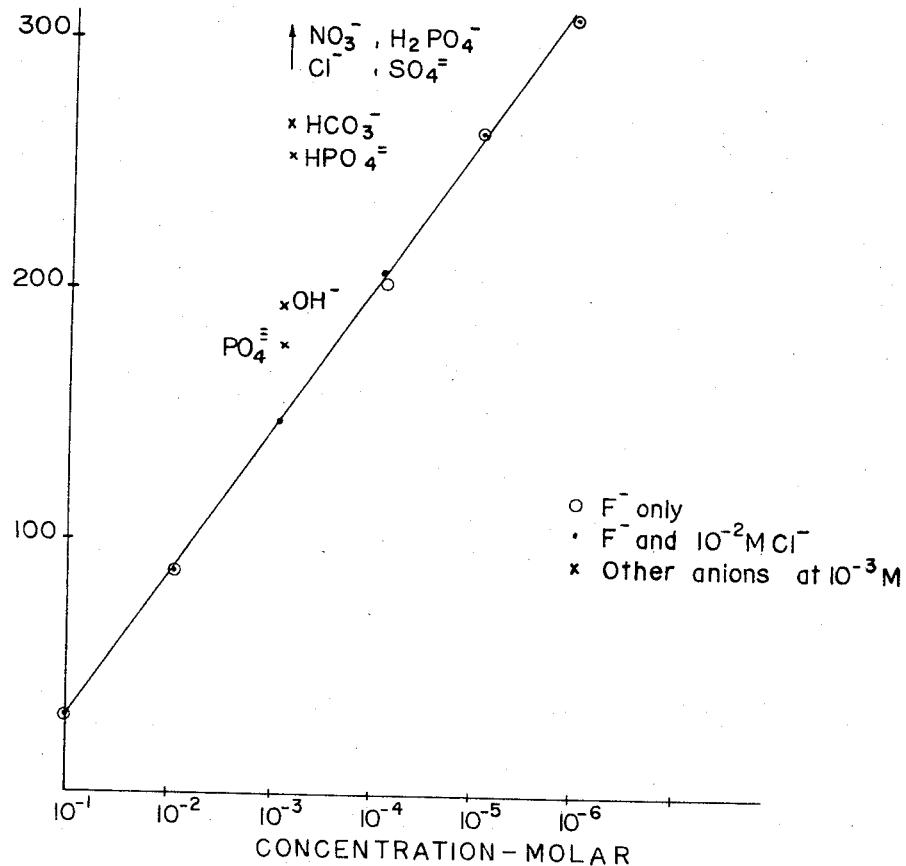
FIG. 3
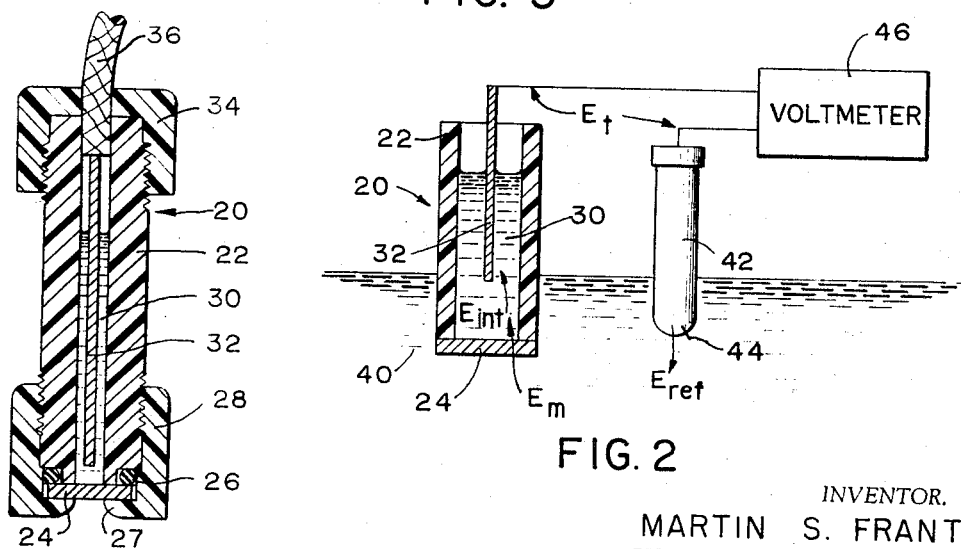
FIG. 1
FIG. 2
INVENTOR.
MARTIN S. FRANT
BY Robert J. Schiller
ATTORNEY United States Patent Office 3,431,182
Patented Mar. 4, 1969

3,431,182
FLUORIDE SENSITIVE ELECTRODE AND
METHOD OF USING SAME
Martin S. Frant, Newton, Mass., assignor to Orion Research, Inc., Cambridge, Mass., a corporation of Massachusetts
Filed Feb. 4, 1966, Ser. No. 525,197
U.S. Cl. 204—1                                       12 Claims
Int. Cl. B01k 3/06

ABSTRACT OF THE DISCLOSURE

A potentiometric type electrode for and method of detecting fluoride ion activity in solution, the electrode having, as its ion-sensitive element, a membrane of substantially imporous, solid, ionic fluoride substantially insoluble in the solution. The membrane is contacted at one surface by the solution and at the other surface by a reference electrolyte providing a fixed contact potential. Exemplary membranes are formed of fluorides of the lanthanide series of selected rare earth metals, preferably as single large crystals.

---

This invention relates to electrochemical detection and measurement and more particularly to methods for determining and measuring the presence of fluoride ions, and novel apparatus for use in such methods.

Considerable interest exists in providing methods for determining the concentration of dissolved fluorides in water, particularly since fluoridation of municipal water supplies has now become quite common. A number of gravimetric and volumetric methods are in use for determining dissolved fluoride, but all of these suffer from the drawback that they are only applicable to relatively concentrated solutions, since they require that the fluoride be determined by the precipitation of calcium fluoride, lead fluoride, lead fluoride-chloride, or some other insoluble fluoride salt. The same is true of indirect titrations such as that involving calcium and EDTA. Further, all of the gravimetric and volumetric procedures require isolating of a sample from the stream and subsequent analysis at a later point in time.

Some electrochemical techniques are known but have been quite unsatisfactory. For example, polarographic determinations of fluoride can be made but require much preliminary processing to remove interfering ions. Further, such methods are sensitive to electrode area and spacing, stirring rate and other variables. An amperometric method is known based on the etching of silicon by fluorides, but requires a highly acid test solution. An electrode has been reported [S. Megregian, Anal. Chem. 29, 1063–65 (1957)], which is based on the dissolution of zirconium oxide from zirconium metal, but its response was only to concentrations of fluoride greater than normally found in drinking water, and was not Nernstian.

The present invention, therefore, contemplates an improved method and means for detecting electrochemically, the presence of fluoride ions in solution.

Further objects of the present invention are to provide a method of detecting fluoride ions which requires no reagent addition or sample pretreatment, and is insensitive to sample solution flow rate, thereby permitting direct-on-stream monitoring; to provide means for carrying out the foregoing method which yields a continuous output signal voltage bearing a simple logarithmic relation to fluoride ion activity with sufficiently rapid response time to changes in the fluoride ion activity to permit control in substantially real-time.

Yet another principal object of the invention is to provide a sensing electrode sensitive to fluoride ion activity in a stable and reproducible manner.

Still another object of the present invention is to provide a fluoride ion-sensitive electrode comprising means supporting an imporous barrier or membrane of a substantially water insoluble, crystalline ionic fluoride and means in electrical contact with one side of the membrane at a substantially fixed reference potential.

Yet other objects of the invention will in part be obvious and will in part appear hereinafter. The invention accordingly comprises the apparatus possessing the construction, combination of elements, and arrangement of parts and comprises the several steps and the relation of one or more of such steps with respect to each of the others of which are exemplified in the following detailed disclosure, and the scope of the application of which will be indicated in the claims.

For a fuller understanding of the nature and objects of the present invention, reference should be had to the following detailed description taken in connection with the accompanying drawing wherein:

FIG. 1 is a schematic, side-elevational, cross-sectional diagram of an electrode embodying the principles of the present invention and useful for fluoride ion detection in a solution.

FIG. 2 is a schematic, side-elevational view, partly in cross-section, of a cell employing an electrode similar to FIG. 1 for the detection of fluoride ions;

FIG. 3 is a graph of the response of an electrode of the present invention to fluoride ions.

The present invention is based upon the use of an imporous membrane of crystalline fluoride substantially insoluble in water, as a fluoride transducer. The term "membrane" as used herein, consistent with its usage in potentiometric electrode technology, is intended to embrace a sheet-like structure, generally regardless of flexibility or curvature, which provides a pair of limiting surfaces between which charge transfer is effected.

Referring now to the drawing, there is shown in FIG. 1 electrode 20 embodying the principles of the present invention and comprising an elongated, hollow tubular container or stem 22 open at both ends. The stem typically is formed of a liquid-impervious, substantially rigid, electrically-insulating material, such as unplasticized polyvinylchloride, polytetrafluoroethylene, or the like, substantially chemically inert to salt solutions containing fluoride ions and with which the stem might be placed in contact.

One end of stem 22 is capped or sealed with a barrier disc or membrane 24 formed of a substantially imporous, high-purity, crystalline fluoride. Membrane 24 can be quite thick, for example, ¼" although thinner structures are preferred. Membrane 24 can be sealed across the one end of stem 22 with an appropriate sealing compound such as an epoxy or polyester resin. Alternatively, as shown, the membane is mounted by an O-ring 26 disposed about the periphery of the opening in the stem, and held in pressed-fit against the O-ring by annular flange 27 of collar 28 threadedly mounted on the stem. When collar 28 is rotated in the proper direction, it advances axially, forcing membranes 24 in a tight fit abainst the O-ring, thus sealing the one end of stem 22. Both the O-ring and collar 28 are preferably made of plastic material such as polyvinylchloride.

Disposed internally of stem 22 and in electrical and physical contact with the inner surface of membrane 24 is charge transfer means providing a fixed concentration of ions. This means is shown as a reference electrolyte 30, for example, an aqueous saturated solution of KCl, AgCl, and 1 molar in fluoride from KF. Immersed in electrolyte 30 is internal reference electrode 32, for example the well-known Ag-AgCl element. This combination of electrolyte 30 and reference electrode 32 provides means for electrically contacting the internal face (i.e. the surface of the membrane contacting the reference electrolyte) at a substantially stable or fixed potential.

The other open end of stem 22 is fitted with annular cap 34 having an aperture in which is sealed the usual coaxial cable 36, the central conductor of which is connected to internal reference electrode 32 and the peripheral conductor of which is intended to provide electrostatic shielding.

The more important considerations in fabricating the electrode of FIG. 1 lie in the material and structure of membrane 24 and the nature of the seal between the electrode stem and the membrane as above described. The other elements and the shape and size of the electrode are not particularly critical and can be selected according to the anticipated use.

The fluoride salts used to form the membrane of the present invention are those which are highly insoluble in water and can be formed into a substantially imporous, solid ionic crystalline mass, i.e. membrane. Among such salts are particularly the trifluorides of bismuth, scandium, yttrium and the lanthanide series of rare earth metals, and the difluoride of lead. The membrane can be formed as a compressed pellet of polycrystallite powder or as a unitary "monocrystal" depending on a number of factors.

For example, it is difficult to grow large crystals of $BiF_3$. However, powdered $BiF_3$ can be compressed in steel dies at elevated temperature to provide an imporous pellet. Typically, one can employ a pressure of 50,000 p.s.i. at 500–550° C. Without heating at this pressure, the pellet produced is porous and unsuitable. Naturally, higher pressures at lesser temperatures will prove adequate to provide the requisite pellet. The heating does produce some metallic bismuth inclusion in the pellet but this "impurity" does not affect the performance of the membrane because it does not appear at any surface where it will be susceptible to redox potentials. Powdered polycrystalline lead difluoride and the other noted fluorides can be similarly compressed into the desired membrane.

Alternatively, a number of rare earth metal fluorides are commercially available as monocrystalline slabs quite suitable for use as a membrane of the present invention. For example, neodymium fluoride is available in optical grade, solid, grown monocrystals purportedly 99.99% pure. Similarly, lanthanum, cerium, praseodymium, and other rare earth metal fluorides are commercially available in monocrystalline form.

The membranes, whether "monocrystalline" or polycrystalline, can be of mixed fluoride structures such as a mixture of lanthanum and cerium fluorides, provided, of course, that the fluorides are all highly water insoluble. The mixed-fluoride structures exhibit selectively to fluoride ions comparable to single-fluoride structures.

The term "highly insoluble" as used herein is intended to mean that the fluoride crystals have a solubility product when in equilibrium with the aqueous solution being examined by the electrode, such that the concentration in that solution of fluoride ions derived from the crystals is less than the lowest fluoride activity that one can reasonably expect or intend to measure.

From a practical standpoint, because it is usually desired to measure $F^-$ concentrations at least as low at 1 p.p.m., it is preferred that the solubility product of the fluoride membrane be smaller than would yield a 1 p.p.m. $F^-$ concentration when placed into equilibrium with distilled water. Thus, a number of "insoluble" fluorides, such as $CaF_2$ and $BaF_2$ are unsuitable.

It has now been discovered that a membrane of XF separating two solutions (where XF is a fluoride salt of the invention) one of which contains fluoride ions at a fixed concentration and the other of which is a sample solution, will develop a potential $Em$ according to the well-known Nernst equation as follows:

(1) $$Em = \text{constant} + \frac{RT}{F} \ln A_{F^-}$$

where $A_{F^-}$ is the fluoride ion activity in the sample solution.

As shown in FIG. 2, sensing electrode 20 of the present invention in use is placed so that the outer surface of membrane 24 contacts solution 40 under test (i.e. which contains the fluoride ions sought to be detected). A standard reference electrode 42 is also placed in contact with solution 40.

Electrode 42 typically is the usual assembly housed in a conventional glass shell containing an Ag-AgCl electrode in saturated aqueous KCl-AgCl separated by an asbestos fiber junction from a 1 M NaOH solution. The latter solution occupies the lower end of the shell and is coupled to solution 40 through the usual fiber junction shown at 44. Both sensing electrode 20 and reference electrode 42 are connected electrically to respective inputs of electrometric device 46, the latter being preferably the usual high-input impedance voltmeter.

In operation of the assembly of FIG. 2, a potential, $E_{ref.}$ of substantially fixed value (assuming constant temperature conditions) develops between reference electrode 42 and solution 40 independently of flouride concentration in the latter. Another potential, $Em$, will develop across membrane 24 between internal electrolyte 30 and solution 40, but $Em$ is dependent or varies logarithmically according to the activity or concentration of flouride ions in solution 40. Because the potential, $E_{int.}$, between reference electrode 32 and electrolyte 30 is also fixed, the total potential $E_t$, appearing between electrodes 42 and 20 will be the sum of $E_m$, $E_{ref.}$ and $E_{int.}$ and thus varies with $E_m$ only. $E_t$ can be readily measured on electromethic device 46, thus indicating the presence and activity of the fluoride ions in solution 40.

The electrode of FIG. 1 was tested in an assembly such as that of FIG. 2 in a number of experiments to demonstrate the nature of the response to fluoride ions in aqueous salt solutions as set forth in the following examples:

Example I

The electrode of FIG. 1 was constructed as follows: a commercial grade of bismuth trifluoride was compressed in a steel die approximately a quarter of an inch in diameter, to a thickness of about 3 mm. at a pressure in excess of 50,000 p.s.i. This tablet, still in the die, was then heated to 500–550° C. and then recompressed while still hot.

The tablet was sealed over the end of a polyvinylchloride tube and an internal contact was made by placing a quantity of bismuth amalgam in contact with the tablet. A platinum wire was inserted into the amalgam as a lead. The electrode was tested in an assembly such as shown in FIG. 2 wherein reference electrode 42 was an Ag-AgCl electrode.

This electrode of the invention was used to obtain a series of responses to a number of pure aqueous sodium fluoride solutions of different molarities, with the following results:

| Concentration of $F^-$, m./l.: | Reading in mv. |
| --- | --- |
| $1 \times 10^{-1}$ | +87 |
| $1 \times 10^{-2}$ | +140 |
| $1 \times 10^{-3}$ | +194 |
| $5 \times 10^{-4}$ | +212 |
| $1 \times 10^{-4}$ | +232 |
| $5 \times 10^{-5}$ | +254 |
| $1 \times 10^{-5}$ | +281 |
| 0 | +307 |

To determine the effect of "interfering" anions on the electrode response, this electrode was tested in a number of aqueous solutions each containing a different anion in a particular concentration. The responses found as follows:

| Anion and concentration, m./l.: | Mv. response |
|---|---|
| $Cl^-$, $1 \times 10^{-5}$ | +309 |
| $Cl^-$, $1 \times 10^{-4}$ | +282 |
| $Cl^-$, $1 \times 10^{-3}$ | +267 |
| $HCO_3^-$, $1 \times 10^{-5}$ | +296 |
| $SO_4^=$, $1 \times 10^{-4}$ | +264 |
| $I^-$, $1 \times 10^{-4}$ | +267 |
| $NO_3^-$, $1 \times 10^{-4}$ | +280 |

Example II

A pellet of optical grade (99.99% pure), monocrystalline lanthanum trifluoride, about 10 mm. in diameter and 4 mm. thick, was sealed over the end of a polystyrene tube. The latter was filled with an aqueous solution saturated with respect to KCl and AgCl and 1 molar in fluoride. An Ag-AgCl electrode was placed in the internal solution.

This electrode was tested in a configuration such as is shown in FIG. 2 using a standard Ag-AgCl electrode as reference electrode 42. A number of aqueous solutions of only sodium fluoride at different concentrations were tested and the readings in millivolts vs. log concentration are graphically shown in FIG. 3. A similar series of fluoride solutions, each containing $Cl^-$ ions in $1 \times 10^{-2}$ molarity, were also tested and the readings are also shown in FIG. 3 indicating that the electrode responded to $F^-$ ions in substantially the same manner regardless of the presence of $Cl^-$ ions.

The electrode was further tested in aqueous solution of various ions, all at $10^{-3}$ M concentrations. The readings in millivolts are each shown and identified by the ionic symbol in FIG. 3.

Example III

An electrode was formed as in Example II except that the membrane was optical grade monocrystalline praseodymium trifluoride (10 mm. diameter, 2 mm. thick). When similarly tested against similar aqueous solutions the following results were obtained:

| Concentration of $F^-$, m./l. | Reading in mv. fluoride only present | Reading in mv. $1 \times 10^{-2}$ $MCl^-$ present |
|---|---|---|
| $1 \times 10^{-1}$ | +28 | +28 |
| $1 \times 10^{-2}$ | +82 | +82 |
| $1 \times 10^{-3}$ | +138 | +141 |
| $1 \times 10^{-4}$ | +193 | +199 |
| $5 \times 10^{-5}$ | +213 | +216 |
| $1 \times 10^{-5}$ | +249 | +251 |
| $5 \times 10^{-6}$ | +265 | |
| $1 \times 10^{-6}$ | +305 | +276 |

When tested against other ions as in Example II, each being in aqueous solution at a $1 \times 10^{-3}$ M concentration the following results were obtained:

| Ion: | Reading in mv. |
|---|---|
| $PO_4^{\equiv}$ | +156 |
| $OH^-$ | +161 |
| $HPO_4^=$ | +194 |
| $HCO_3^-$ | +225 |
| $H_2PO_4^-$ | +269 |
| $SO_4^=$ | +270 |
| $NO_3^-$ | +288 |

Example IV

An electrode was formed as in Example II using cerium trifluoride as the membrane. When tested as in Example III, the following readings were obtained:

| Concentration of $F^-$, m./l. | Reading in mv. fluoride only present | Reading in mv. $1 \times 10^{-2}$ $MCl^-$ |
|---|---|---|
| $1 \times 10^{-1}$ | +30 | +30 |
| $1 \times 10^{-2}$ | +84 | +85 |
| $1 \times 10^{-3}$ | +140 | +143 |
| $1 \times 10^{-4}$ | +196 | +201 |
| $5 \times 10^{-5}$ | +216 | +219 |
| $1 \times 10^{-5}$ | +252 | +254 |
| $5 \times 10^{-6}$ | +269 | +265 |
| 0 | +304 | |

| Ion at $1 \times 10^{-3}$ m./l.: | Reading in mv. |
|---|---|
| $PO_4^{\equiv}$ | +142 |
| $OH^-$ | +157 |
| $HPO_4^=$ | +194 |
| $HCO_3^-$ | +220 |
| $H_2PO_4^-$ | +317 |
| $SO_4^=$ | +264 |
| $NO_3^-$ | +314 |

Example V

An electrode was formed as in Example II using optical grade neodymium trifluoride as the monocrystalline membrance, and when tested as in Example III, the following results were obtained:

| Concentration of $F^-$, m./l. | Readings in mv. fluoride only present | Readings in mv. $1 \times 10^{-2}$ $MCl^-$ present |
|---|---|---|
| $1 \times 10^{-1}$ M | +29 | +29 |
| $1 \times 10^{-2}$ M | +86 | +86 |
| $1 \times 10^{-3}$ M | +141 | +144 |
| $1 \times 10^{-4}$ M | +202 | +200 |
| $5 \times 10^{-5}$ M | +218 | +222 |
| $1 \times 10^{-5}$ M | +258 | +238 |
| $5 \times 10^{-6}$ M | | +270 |

| Ions and concentrations, m./l.: | Readings in mv. |
|---|---|
| $OH^-$, $1 \times 10^{-4}$ | +230 |
| $HPO_4^=$, $5 \times 10^{-1}$ | +200 |
| $HCO_3^-$, $1 \times 10^{-2}$ | +200 |
| $H_2PO_4^-$, $1 \times 10^{-2}$ | +174 |
| $SO_4^=$, $5 \times 10^{-2}$ | +270 |
| $NO_3^-$, $1 \times 10^{-2}$ | +280 |

Example VI

An electrode was formed as in Example II using a monocrystalline slab of lanthanum trifluoride containing 10 mol percent of neodymium trifluoride.

When tested as hereinbefore described in a series of pure aqueous fluoride solutions, the following results were obtained:

| Concentration of $F^-$, m./l. | Response in mv. |
|---|---|
| $1 \times 10^{-2}$ | +98 |
| $1 \times 10^{-3}$ | +149 |
| $5 \times 10^{-4}$ | +168 |
| $2.5 \times 10^{-4}$ | +184 |
| $1 \times 10^{-4}$ | +199 |
| $5 \times 10^{-5}$ | +210 |
| $2.5 \times 10^{-5}$ | +215 |
| $1 \times 10^{-5}$ | +239 |

Example VII

The electrode of FIG. 1 was constructed by preparing a membrane of lead fluoride powder compressed at room temperature under pressure in excess of 60,000 p.s.i. The membrane was sealed, as shown, over the end of a rigid polyvinylchloride tube and internal aqueous filling solution of saturated KCL-AgCl-KF was inserted into the tube. As reference electrode 42, an Ag-AgCl wire was provided.

When tested in aqueous fluoride solutions as hereinbefore described, it was found to respond to fluoride ions but only in concentrations greater than $1 \times 10^{-3}$ M. It also showed approximately equal sensitivity and similar slope for chloride ions as for fluoride ions. It is thus limited to use where one of these ionic species is present at relatively higher concentration than the other or where the sum of mixed fluoride-chloride activity is desired.

Example VIII

The electrode of Example V was selected, as representative of the others, for determining the effect of pH on electrode response. Measurements were made on samples of aqueous NaF solution standardized at $1 \times 10^{-2}$ M, having pH adjusted either with NaOH or HCl.

It was found that between about pH 5 to pH 13 the electrode response was completely independent of the pH. Above pH 13, where the hydroxyl ion concentration exceeds the fluoride ion concentration, the electrode responded markedly to the hydroxyl ion. Below pH 5 on the acid side, the electrode continued to indicate the true fluoride activity. This latter is known to diminish rapidly as a function of pH because of the formation of undissociated HF; thus, the response curve no longer was flat.

Example IX

That the electrodes of the foregoing examples can be used for monitoring a wide range of drinking water is established by the following experiments.

Water samples were selected from the following communities:

(1) Wayland, Mass. which does not fluoridate its municipal supply and uses deep wells as the source. This water was relatively low in mineral content.

(2) Cambridge, Mass. where the water from local open reservoirs does not contain added fluorides, and at the time of testing was very high in dissolved solids because of a drought condition. The water contained 234 p.p.m. total dissolved solids, had a hardness of 132 p.p.m., and a chloride content of 60 p.p.m.

(3) Newton, Mass. which add fluorides to its water by an indirectly controlled system. The water is obtained from Quabbin reservoir, some sixty miles distant.

These waters were tested with the lanthanum fluoride electrode of Example II with the following results:

| Community: | F− in p.p.m. |
|---|---|
| Wayland | .12 |
| Cambridge | .12 |
| Newton | .72 |

As will be seen from the foregoing representative examples, the bismuth and lead fluorides show excellent responsiveness to fluoride ions, but for some purposes, their response to other ions such as chloride, sulfate and the like, is too high. For example, this level of response to other ions would be a problem in testing the relatively hard waters found in some areas.

On the other hand, scandium, yttrium and the lanthanum group of rare earth fluoride electrodes appear to have selectivity for the fluoride ion over chloride by a factor so much greater that the presence of quite high (ca. $10^{-2}$ M or about 200 p.p.m.) concentrations of chloride do not seem to affect the electrode response except at levels of fluoride of approximately $1 \times 10^{-5}$ M (i.e. about 0.2 p.p.m.) or less. The most seriously competing ions seem to be OH− and $PO_4^\equiv$. The response to hydroxyl ion, which is about 20 mv. or more below the response to fluoride ion, is not considered serious inasmuch as the presence of hydroxyl ions is easy to measure and, if necessary, the electronics associated with the electrode can be duly compensated for hydroxyl response. Further, this is necessary, if at all, only where the water has a pH above 8. The effect of the phosphate ion is not considered serious either unless in highly basic solutions (>pH 12) and in fact, may instead be due to hydroxyl ion. Around pH 7 the phosphate is normally present in about 1:1 proportions of mono and dihydrogen phosphate ions, neither of which particularly interferes with the fluoride determination.

The electrodes of the present invention are generally quite specific in their response to fluoride ion and this is believed due to the extreme insolubility of the fluoride salts used in the invention, which prevents interference due to metathetical reactions with almost all ionic species in aqueous solution.

Obviously, other electrode configurations can be made. Thus, for example, a flow-through type of fluoride electrode can be made by growing or compressing an appropriate fluoride into cylindrical form and axially boring out the center to form a hollow tube with walls as thick as ¼″. The exterior of the tube can then be electrically connected at a fixed contact potential to a wire as by coating the tube with an annular strip of an appropriate amalgam or otherwise electrically connecting a wire to the latter. The exterior is then sealed with insulation. If a solution with fluoride ions is passed through the tube interior, the desired potential will develop across the tube from the interface with the solution to the electrically conductive wire.

Since certain changes may be made in the above apparatus and processes without departing from the scope of the invention herein involved it is intended that all matter contained in the above description or shown in the accompanying drawing shall be interpreted in an illustrative and not in a limiting sense.

What is claimed is:
1. An electrode for detecting fluoride ion activity in solution, and comprising, in combination:
   a substantially imporous membrane adapted to have one surface thereof contacted by said solution, said surface comprising an ion-sensitive crystalline fluoride selected from the group consisting of lead fluoride and the trifluorides of bismuth, scandium, yttrium and the lanthanide series of rare earth metals said surface being substantially free of the metal of which said fluoride is the salt; and
   means forming an electrical contact with the opposite surface of said membrane at a substantially fixed contact potential.

2. An electrode as defined in claim 1 wherein said crystalline fluoride is the trifluoride of a metal of the lanthanide series.

3. An electrode as defined in claim 1 wherein said crystalline fluoride is the trifluoride of cerium, lanthanum, praesodymium, neodymium, or mixtures thereof.

4. An electrode as defined in claim 3 wherein said membrane is a monocrystal of said crystalline fluoride.

5. An electrode as defined in claim 1 wherein said fluoride in said membrane is in polycrystalline form.

6. Method of making an electrode sensitive to ions in a fluid, comprising the steps of:
   forming an ion-sensitive portion of said electrode of a substantially imporous membrane comprising an ion-sensitive crystalline fluoride, at least one surface of said membrane being substantially free of the metal of which said fluoride is the salt, said fluoride being selected from the group consisting of lead fluoride and the trifluorides of bismuth, scandium, yttrium and the lanthanide series of rare earth metals; and
   forming an electrical contact to another surface of said membrane at a fixed contact potential.

7. Method as defined in claim 6 wherein said step of forming comprises the step of compressing said fluoride, in powdered form, into said membrane at pressures above about 30,000 p.s.i. referred to room temperature.

8. Potentiometric method of measuring the activity of fluoride ion in solution and comprising the steps of:
   contacting said solution with a reference electrode to establish a fixed contact potential;
   contacting said solution with a surface of a substantially imporous, ionic crystalline membrane of a fluoride, said surface being substantially free of the metal of which said fluoride is the salt, and said fluoride being selected from the group consisting of the fluorides of the lanthanide series of rare earth metals from lanthanum to europium inclusive, connecting the other membrane surface to electrically conductive means at a fixed contact potential; and measuring the total potential between said reference electrode and said electrically conductive means.

9. A potentiometric system for measuring ion activity of a sample solution, comprising:
  a reference electrode adapted to provide a reference potential when in contact with said sample;
  a sensing electrode having an ion-sensitive portion thereof comprising solid imporous, ionic, crystalline fluoride and being substantially free at a surface thereof from the metal of which said fluoride is the salt, said fluoride being selected from the group consisting of the fluorides of the lanthanide series of rare earth metals from lanthanum to europium inclusive; and
  an electrical circuit connecting said electrodes for measuring the electrical potential of a contact between said ion-sensitive portion and said sample at said surface.

10. An ion-sensitive element of an electrode for potentiometric detection of fluoride activity in solution and comprising:
  a fluoride-ion sensitive membrane including at least one fluoride of the lanthanide series of rare earth metals.

11. An ion-sensitive element of an electrode for potentiometric detection of fluoride activity in solution and comprising:
  a fluoride-ion sensitive membrane including at least one fluoride selected from the group consisting of the fluorides of the lanthanide series of rare earth metals from lanthanum to europium inclusive.

12. An ion-sensitive element of an electrode for potentiometric detection of fluoride activity in solution and comprising:
  a fluoride-ion sensitive membrane including lanthanum fluoride.

References Cited

UNITED STATES PATENTS 3,058,901  10/1962  Farrah _____ 204—1.1
3,129,148  4/1964  Steinbrecher et al. ___ 204—195

HOWARD S. WILLIAMS, *Primary Examiner.*

T. TUNG, *Assistant Examiner.*

U.S. Cl. X.R.
204—195, 291, 295